May 14, 1974 W. B. GOLDSWORTHY ET AL 3,810,805

GEODESIC PATH LENGTH COMPENSATOR FOR COMPOSITE-TAPE PLACEMENT HEAD

Filed April 14, 1972 5 Sheets-Sheet 1

3,810,805

GEODESIC PATH LENGTH COMPENSATOR FOR COMPOSITE-TAPE PLACEMENT HEAD

William B. Goldsworthy, Palos Verdes Estates, Harald E. Karlson, Santa Monica, and Ethridge E. Hardesty, Pine Valley, Calif., assignors to Goldsworthy Engineering, Inc., Los Angeles, Calif.

Filed Apr. 14, 1972, Ser. No. 244,187
Int. Cl. B32b *31/18*
U.S. Cl. 156—361 14 Claims

ABSTRACT OF THE DISCLOSURE

An integrally complete composite-tape placement head for direct attachment to a host gantry type of machine, which tape placement head is designed to precisely apply preimpregnated fiber reinforced tape to a work piece. The tape is initially supplied having a release paper forming a backing for the same. The tape is automatically peeled from the backing by a separator mechanism and thereafter applied to the work piece. A combination strand separation device and geodesic path length compensator is provided for applying the tape to curved surfaces without creating any buckling effects.

BACKGROUND OF THE INVENTION

This invention relates in general to certain new and useful improvements in composite-tape placement heads for direct attachment to actuating equipment.

In recent years, reinforced plastic composite materials have achieved increased prominence and have been used in the manufacture of a variety of products which are normally formed of heavy metals and other counterpart materials. For example, pipe, rocket motor casings and various other types of structural members which were formerly fabricated from the heavy metals are now being produced in the form of reinforced plastics.

Many of the structural members used in the air frame industry are presently formed of aluminum and other light weight metals. However, there has also been a recent transition to the employment of reinforced plastic components. Conventional filament winding systems have been often employed in the fabrication of these reinforced plastic components. In order to increase productivity in the manufacture of these components, resort has been made to the use of tape application equipment.

However, the existent tape laying equipment is ineffective in many cases because the filament reinforced tapes are often difficult to effectively handle due to their modulus of induced rigidity. Accordingly, the unspooling of a three inch tape, for example, presents considerable problems in maintaining proper tension on the tape as it is applied to the work surface. The convolute windings of the tape tend to expand and unwind in the manner of a released clock spring. The various tapes presently employed inherently have some variation in boardiness and tack and the lay down pressure on the work piece is not variable to adjust for these variations in the tape.

Employing a three inch wide filament reinforced composite tape to conform to compound curved surfaces presents a substantial problem in the presently available tape placement devices, inasmuch as there is no mechanism to compensate for the bending of the tape in a span-wise direction. Accordingly, the existent tape placement heads are not capable of laying a fairly wide tape on a compound curved surface in a fair and tight manner. Furthermore, problems of unequal demand distribution across the tape's width resulting from proportional difference in elemental geodesic path lengths do arise. This unequal demand distribution will vary according to the degree of curvature and this may range from fractional amounts to very substantial dimensional differences. Accordingly, the tape placement heads of the prior art are not capable of obviating the problem.

It is, therefore, the primary object of the present invention to provide an integrally complete composite-tape placement head for direct attachment to other actuating equipment.

It is another object of the present invention to provide a tape placement head of the type stated which can be actuated both in cooperation with and independently of the host actuating equipment.

It is another object of the present invention to provide a tape placement head of the type stated which includes all of the tape forwarding, tape-placement, backing-film retrieval, and tape-cut-off mechanical and drive functions.

With the above and other objects in view, our invention resides in the novel features in form, constructions, and arrangement of parts presently described and pointed out in the claims.

GENERAL DESCRIPTION

Figure 1:
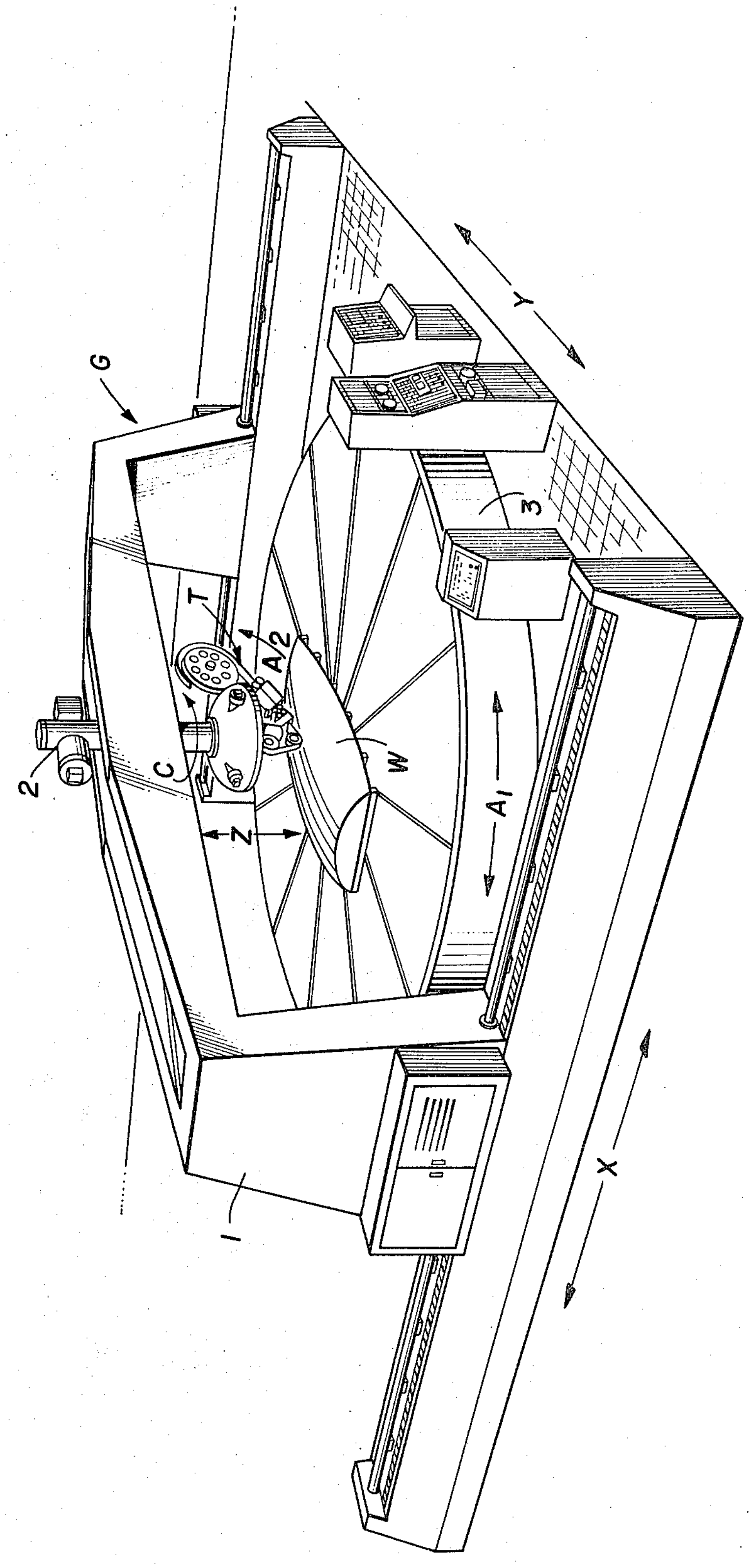
FIG. 1 is a perspective view of a host gantry machine having a tape placement head of the present invention operatively mounted thereon and schematically illustrating the application of tape strands to a work piece.

Generally speaking, the present invention relates to a filament tape applicator (often referred to as a "tape head" or "tape placement head") which is used on a selected type of host actuating equipment, such as a gantry machine. The tape placement head is normally shifted through X and Y coordinate axes through the action of the gantry machine. In addition, the tape placement head is constructed so that it can shift along additional axes with respect to the gantry machine.

The tape placement head of this general type includes a relatively large major support bracket for removable securement to the host actuating equipment. A motor is suitably mounted on the supporting frame and is connected to a drive mechanism for rotating the tape placement head about a depending flange formed on the host actuating equipment. The drive mechanism is designed to rotate the entire tape placement head in a full 180° arc in either direction. Thus, if tape was being placed upon a work piece during the movement of the tape placement head in the X axis, the host actuating equipment would be programmed to automatically stop at the end of the tape application cycle. At this point in time, the motor is actuated to rotate the tape placement head 180°. The host actuating equipment would shift the head laterally in the Y cordinate axis so that a next strand of tape can be placed adjacent to the previously deposited strand of tape.

Also mounted on the supporting frame is a shaft for removably receiving a roll of filament type tape. The tape is secured to a backing film, generally formed of paper, and is preferably pre-impregnated with a suitable resin curable matrix. Furthermore, the supply spool is maintained under a proper degree of tension as the tape strand is paid out from the spool. A separating mechanism may be provided to peel away the backing from the pre-impregnated tape and the backing is retrieved onto a driven wind-up storage spool.

As indicated previously, the supply spool may be driven. The unspoiling of a three inch wide tape, for example, can only be practically accomplished through physical containment and restraint due to the modulus induced rigidity. Otherwise, the convolute windings would tend to expand and unwind in the manner of released clock springs. The tape which is brought into contact with the backing web and the laydown roller is then push-fed against a curving chute which terminates at the point of tangency with a substrate work surface.

A shoe assembly may be mounted on the frame and is pneumatically operated by paired cylinders. The shoe assembly is capable of cutting a three inch wide filament tape through an arc of, for example, ±45° normal to the tape center line. The shoe assembly is driven by a stepping motor which is controlled by a complex-edge-sensing mechanism. The shoe assembly comprises a combination of a shearing type blade and Teflon anvil. The blade is attached to a fixed sheer frame member and the Teflon anvil is attached to a moving platen.

Also, the frame may have mounted on it an infrared type of electrical heating device utilizing a quartz lamp as the heat source and an elliptical reflector to concentrate the heat in a small band at the focal point of the reflector, this band being transverse to the direction of movement of the tape. The quantity of heat is controlled by a transformer. The unit is also designed to rotate away from the tape whenever the tape drive is stopped, in order to prevent localized heating of the tape, thereby providing any premature cure of the tape.

The backing web-strand composite is passed through a shearing device which produces slits in the web approximately, for example, 1/8" apart in the transverse dimension. Accomplishing the slitting action near the point of final assembly for approximately 24 strands into a three-inch band width, allows precise relationship in correlation of parallel alignment. Since each strand is free to deliver any total length irrespective of any other strand comprising the full band width. The present invention provides a mechanism for overcoming the variation in relative strand lengths in any laydown path over a surface of compound curvature.

The three inch tape along with the slit-perforated backing web is advanced against a feed-in chute and located between the ends of the chute and the cut-off device is a web parting device which alternating separates the strands of the web and two spaced-apart successive pairs of powered nip rollers. This dual pair of driven and controlled nip rollers act to maintain the two storage loops in the form of incomplete sine waves. The storage loops now composed of approximately 24 individual web-backed strands is electrically scanned to maintain a practical and economical amount of tape in such demand available storage. As individual strands are drawn, in varying rates, for laydown on a work surface, these loops will become individually varied in amplitude during each laydown path. A pair of photoelectric devices detect the maximum amplitude of these storage loops and control the pairs of powered nip rollers.

DETAILED DESCRIPTION

Referring now in more detail and by reference characters to the drawings which illustrate a preferred embodiment to the present invention, A designates a tape placement head which is secured to a somewhat conventional gantry-type machine is provided.

By reference to FIG. 1, it can be seen that the tape head T is mounted on a gantry machine G having a carriage 1 shiftable along a longitudinal axis X. Furthermore, the tape head is mounted on a support beam 2 which shifts transversely with respect to a work platform 3 forming a part of the gantry machine G. Thus, the support beam 2 shifts in a transverse or Y axis. The support beam 2 is also shiftable vertically in a Z coordinate axis. Thus, the tape head T can be shifted longitudinally with respect to a work piece W in order to apply longitudinal strands of tape to the work piece W. In like manner, the support beam 2 is shiftable transversely so that the tape head T can be shifted in order to apply a next adjacent strand of tape material. Finally, the support beam 2 is shiftable vertically in order to locate the tape head T at a proper distance with respect to the work piece W.

By further reference to FIG. 1, it can be seen that the tape placement head T is also rotatable in an axis C in order to apply tape strands to the work piece in an axis which is angularly displaced with respect to the X or Y axes. Furthermore, the tape head is shiftable arcuately with respect to the Y axis in order to provide an axis $A_2$. Finally, the work piece W is rotatable about a vertical axis, or in a rotatable coordinate axis $A_1$.

Figure 2:
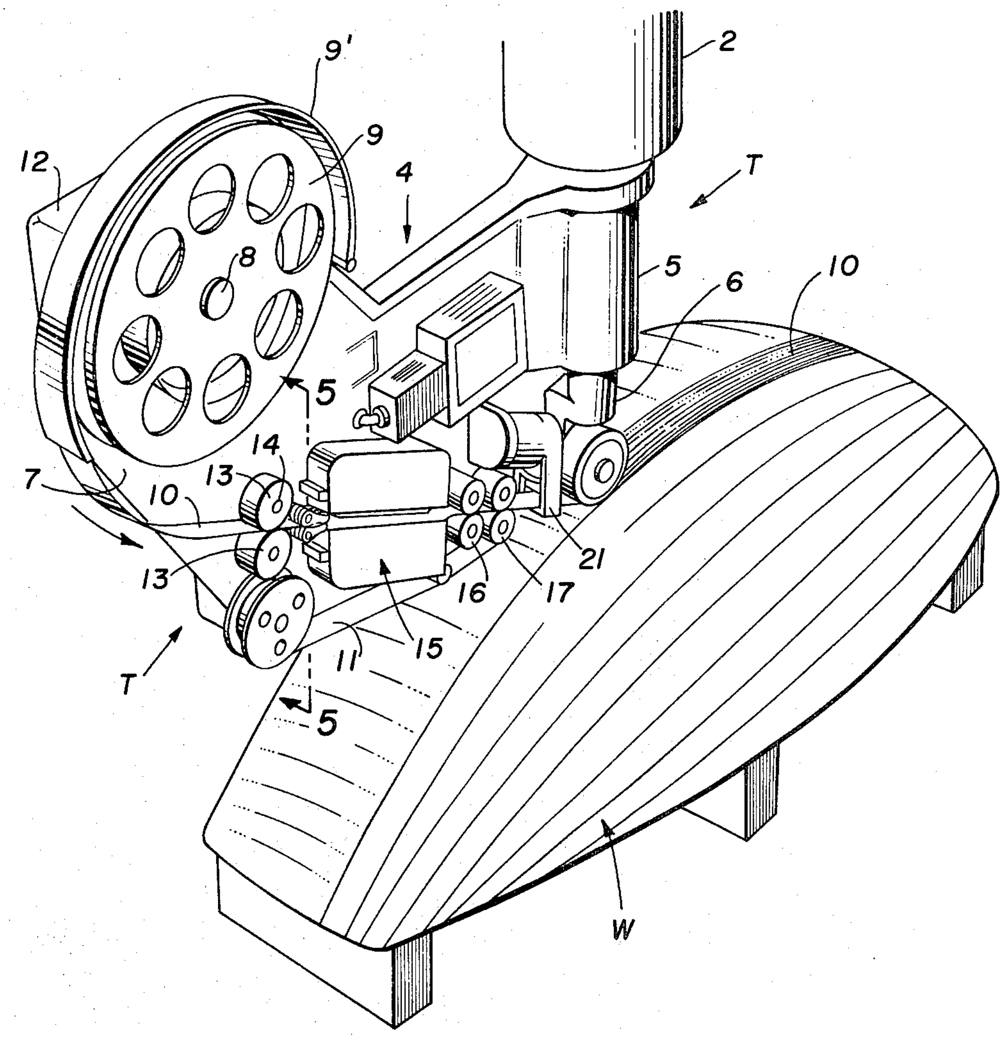
FIG. 2 is a perspective view of a tape placement head constructed in accordance with and embodying the present invention.
Figure 3:
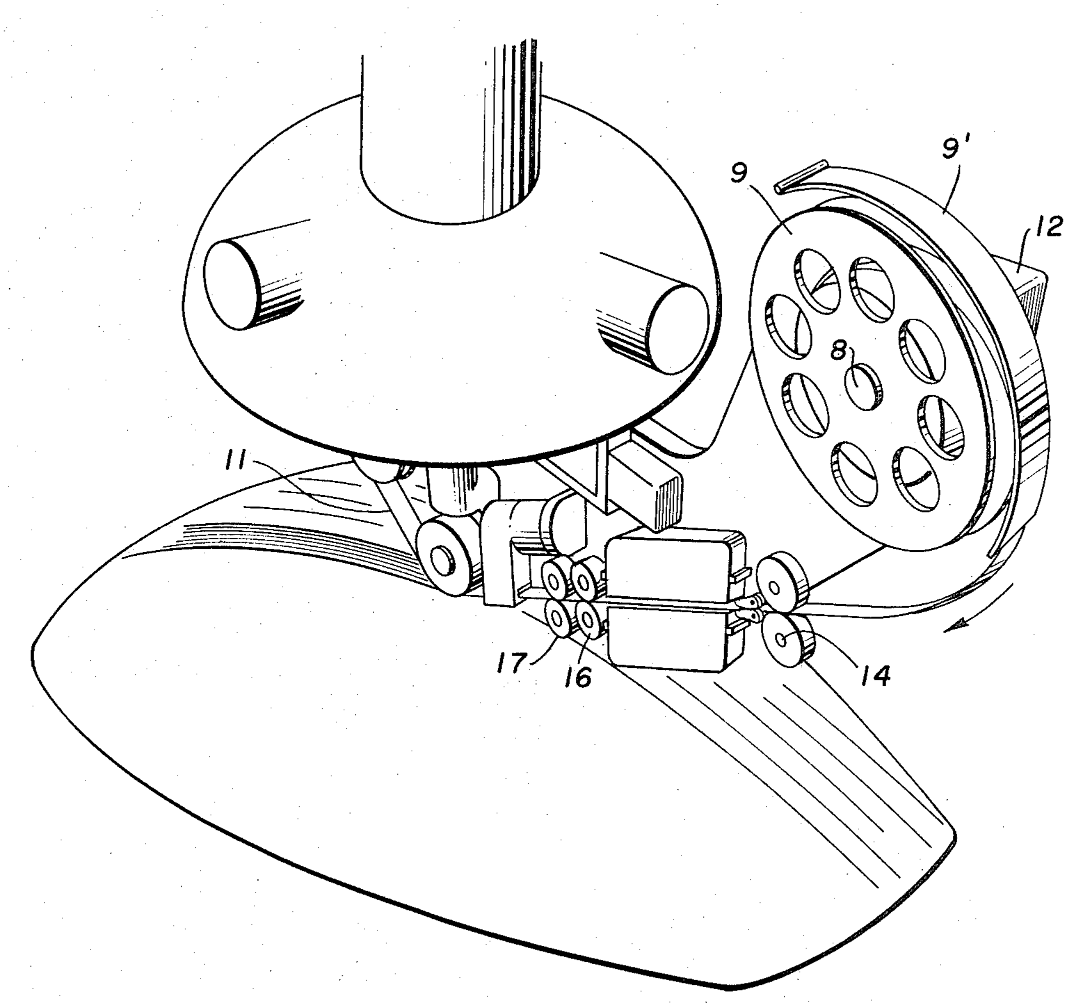
FIG. 3 is a perspective view of the tape placement head of FIG. 2, showing the opposite side of the placement head.
Figure 4:
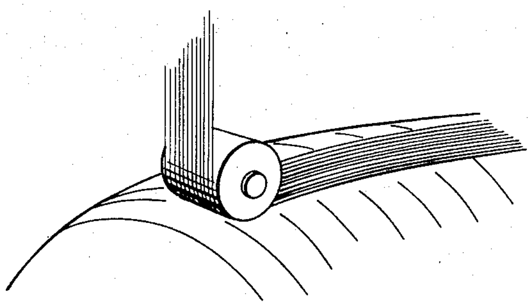
FIG. 4 is a perspective view showing the application of a tape to a work surface of a compound curvature.
Figure 5:
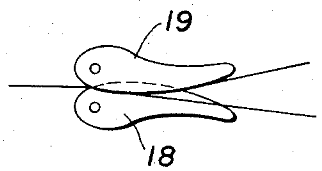
FIG. 5 is an enlarged horizontal fragmentary sectional view taken along the line 5—5 of FIG. 2 and showing the cutting fingers in a closed relationship for cutting the tape incrementally across its width.
Figure 6:
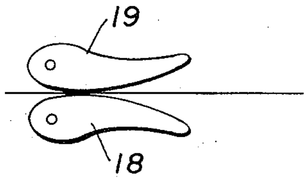
FIG. 6 is an enlarged horizontal fragmentary sectional view similar to FIG. 5 and showing the cutting fingers in an open and non-engaging relationship.

The tape head T is more fully illustrated in FIGS. 2 and 3 and generally comprises a major support frame 4 having an enlarged hub 5 for concentrically receiving a mounting shaft 6. By reference to FIG. 2, it can be seen that the shaft 6 is also concentrically disposed within the beam 2 and is rotatable with respect to beam 2. Thus, the internal bore of the beam 2 as well as the upper end of the shaft 6 would be provided with mating engageable gear rings (not shown) in order to provide for rotational movement of the frame 4 with respect to the beam 2. Thus, the entire tape placement head T can be rotated in 180° arcs with respect to the work piece W and with respect to the gantry machine G. A pair of stops (not shown) may be provided in order to hold the tape placement head T in a locked position. Furthermore, the stops may also be provided with suitable magnetic or other type of locking mechanism in order to maintain a rigid pattern for the tape placement head T while the latter is shifting during the application of the tape.

The frame 4 is integrally formed with an upwardly extending section 7 and journaled on section 7 is a transversely extending reel spindle 8 for supporting a pay-off reel 9, the latter being contained within a shroud 9'. The reel 9 or so-called "spool" contains wound filament reinforced composite tape 10 suitably secured to a removable backing 11. As indicated previously, the tape is of the reinforced composite type and may be preimpregnated with a suitable resin curable matrix. The reel 9 is conveniently removable from the spindle 8 by means of a rotatable locking assembly (not shown). Furthermore, a magnetic brake 12 is secured to the outer end of the spindle 8 to provide a back tension on the spindle 8 and, hence, on the pay-off reel 9.

The backing paper or so-called "backing web" may be conveniently formed of any suitable material which is inert with respect to the tape and any preimpregnated matrix and which is conveniently removable from the tape by means of peeling. For example, the backing web 11 may be formed of paper or a thin flexible plastic material such as polyethylene, Mylar or the like.

The composite tape is generally formed of a series of longitudinally extending substantially parallel strands of filamentary reinforced materials such as fiberglass, lithium, boron, quartz or grown whisker crystals, etc. In addition, metal wire may be interspersed with the filaments in the event that it is desired to add some type of metallic body to the reinforced structure.

Any of a number of commercially available resin matrix materials can also be employed for preimpregnating the tape. The matrix should be capable at some stage of the process of being liquified and softened for a period of time and also should be sufficient to flow around the filaments forming the tape. In addition, the matrix should be capable of achieving a rigid stage of a complete polymerization to become a rigid solid and should also possess ability to adhere to the reinforced material. Some of the suitable matrix matrials which can be employed for pre-impregnating the tape are many of the thermoplastic resins such as polypropylene, polycarbonates, etc. In addition, some thermosetting resins, such as the polyesters can be used. Many of the phenolics and epoxies can be used as well.

The composite of the tape 10 and backing 11 is passed through a pair of driven nip rollers 13 which are powered by a suitable electric motor (not shown). In actual operation only one of the rollers 13 need be driven and the other of these rollers may serve as an idler roller. This combination of nip rollers 13 provides a means for feeding the tape through the system at a preselected rate. The rollers 13 are journaled in the frame 4 by means of shafts 14. An over-running clutch (not shown) may also be fitted between one of the driven rollers 13 and the motor to allow the tape to be unspooled at a rate faster than the motor drive speed in such manner that the machine travel rate determines the tape feed during the actual laying operation.

A problem arises due to unequal demand distribution across the tape's width resulting from a proportional difference in elemental geodisic-path lengths. These lengths will vary according to the degree of curvature of the work surface W and the variance could be a minor amount or a substantial dimensional difference. Further, it should be observed that a unit band width of tape is composed of a number of individual strands and each of these strands is drawn from an independent source in the formation of the tape. In this fashion, each incremental strand is free to deliver any total length of tape, irrespective of any other strand comprising the full band width. In actual practice, however, for twenty-four ⅛″ strands, a minimum of two spools, each carrying twelve individual spools of ⅛″ tape are required. This arrangement would provide the necessary phase shift to bring all strands in together alternately from each spindle in precise adjacency. However, in order to accommodate the necessary spools, the head accessory supporting structure plate could easily exceed 6 feet in width, resulting in about a 3 foot interference radius about a locatable support shaft. In order to obviate the problem of an over-large area while retaining the necessary and compensating ability to accommodate a variation in relative strand lengths in any lay-down path over a surface of compound curvature, a geodesic path length compensator 15 is provided.

Figure 7:
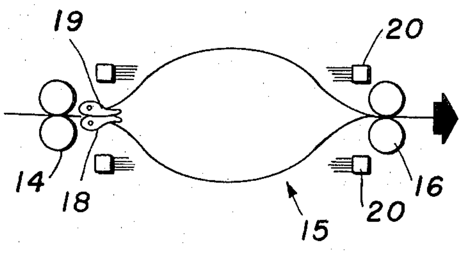
FIGS. 7–12 are a series of sequential schematic views illustrating the formation of strand storage loops from the tape in the geodesic path length compensator forming part of the tape placement head.
Figure 8:
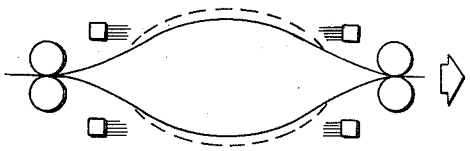
Figure 9:
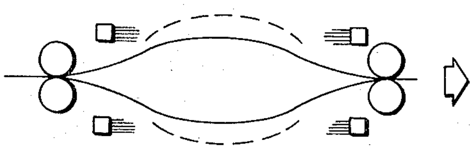
Figure 10:
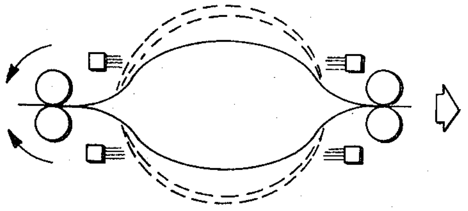

The geodesic path-length compensator 15 is more fully illustrated in FIGS. 7–12. It can be seen that the powered rollers 14 drive the tape into the compensator 15. Also located on the downstream side of the compensator 15 are pairs of driven and controlled rollers 16, 17 respectively. The rollers 14 and the rollers 16 are operated in conjunction so that individual incomplete sine waves are formed from each of the strands in the composite tape. Thus, each adjacent strand is over-driven in order to form the incomplete sine wave in the manner as illustrated in FIG. 7. For example, the first strand would be biased upwardly by means of fingers 18 and the next adjacent strand is biased downwardly by means fingers 19. In like manner, each of the successive adjacent strands is biased upwardly and downwardly respectively. A pair of photoelectric devices 20 are also located in the geodesic path length compensator 15 for detecting the presence of the incomplete sine wave loops. Thus, as the demand for the tape is increased, the amplitude of the loop will decrease in the manner as illustrated in FIG. 8. However, the photoelectric cell 20 still detects the presence of the loops. When demand still increases, the loops are reduced to the size as illustrated in FIG. 9. The photoelectric devices 20 then complete an optical path circuit which indicates that the loops of the strands have been reduced in size. At this point, a signal is transmitted to the motor operating the nip rollers 14 in order to increase the speed thereof beyond the required demand for the tape. As this occurs, the size of the loops will increase in the manner as illustrated in FIG. 10.

Figure 11:
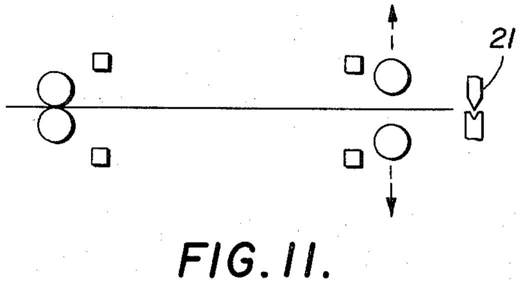
Figure 12:
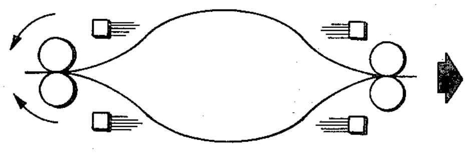

Referring to FIG. 11, it can be seen that when the strand is flat, essentially no loops of tape are formed and the rollers 14 will be signaled to overdrive the tape from the spool 9. In FIG. 12, the incomplete sine waves show a desired amount of strand to form the loop size.

Thus, it can be seen that when the tape is applied to a work surface of compound curvature, varying amounts of the adjacent strands will be required. The storage loops which are formed in the path length compensator 15 provide the individual amount of strand for each adjacent increment of work surface. Accordingly, the strands are applied to the work surface W in such manner that buckling does not result.

It can be seen that the storage loops illustrated in FIGS. 7–12 are composed of twenty-four individual web-backed strands and these strands are electronically scanned to maintain a practical and economical amount of tape in such demand available storage. As indicated previously, the amount of tape desired is accomplished by momentary over-driving on signal, the leading pair of nip rollers. As individual strands are thus drawn for application to the work surface, the loops in the compensator 15 will become individually varied in amplitude during each lay-down operation.

At the conclusion of each lay-down operation, and following a normal cut-off-to edge completion, the entire tape head T lifts in preparation for backing down to begin a new run and hence a new lay-down path. At this point, the second pair of nip rollers 17 release all storage loops allowing a run-out of collected strand ends, as illustrated in FIG. 11. A guillotine type cutter 21 is provided for severing the unequal ranked ends.

Figure 13:
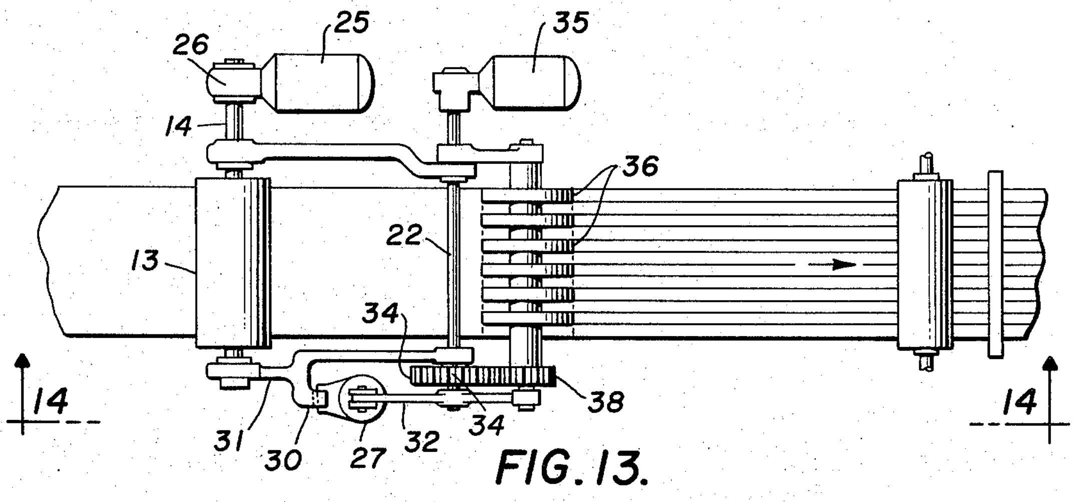
FIG. 13 is a top plan view of a modified form of a slitting mechanism which is similar to that illustrated in FIG. 5.
Figure 14:
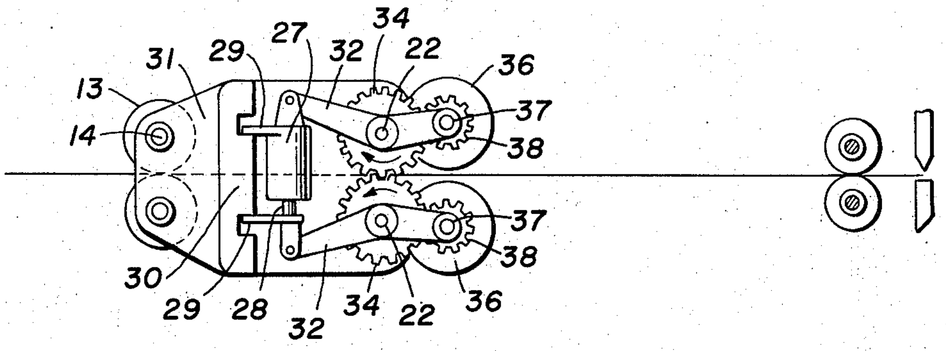
FIG. 14 is a vertical sectional view taken along the line 14—14 of FIG. 13, and showing the slitting members forming a part of the slitting mechanism in an open position.
Figure 15:
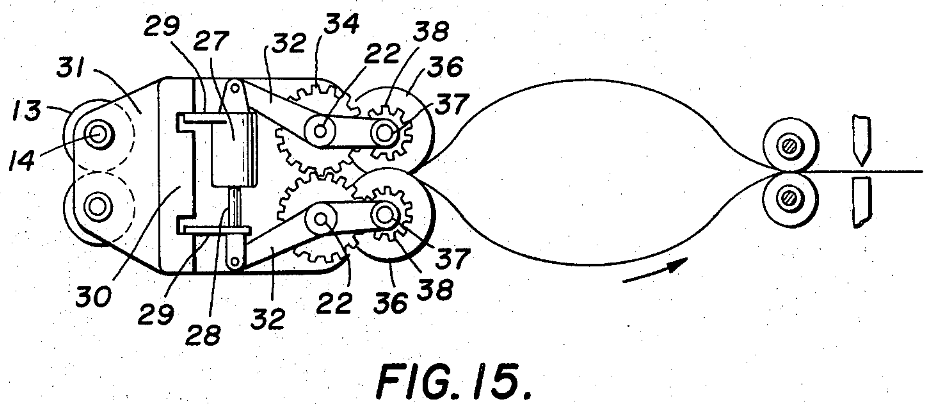
FIG. 15 is a vertical sectional view similar to FIG. 14 and showing the slitting members in a closed or slitting position.

The second embodiment of the tape-web slitting mechanism is more fully illustrated in FIGS. 13, 14 and 15, and comprises an electric motor 25 which drives the pinch rollers 13 through a means of a gear box 26 which is, in turn, connected to the vertically spaced apart shafts or pintles 14. The slitting mechanism, which forms part of the geodesic path length compensator, includes a pneumatic cylinder 27 with a shiftable piston 28. Flange plates 29 are secured to both the cylinder 27 and the piston 28 and are shiftable within a key 30 formed by a bracket 31, in the manner as illustrated in FIGS. 14 and 15. Thus, the key 30 serves as extensible limits for the cylinder 27 and the piston 28 by virtue of controlling the movement of the flange plates 29. Pivotally secured to the cylinder 27 and the piston 28 are crank arms 32, the latter being welded on a pair of vertically spaced apart transversely extending drive shafts 22. By further reference to FIGS. 14 and 15, it can be seen that spur gears 34 are mounted on each of the drive shafts 22 in meshing relationship for providing a common drive action. In addition, either one or both of the drive shafts 22 are driven by means of another electric motor 35. Finally, individual cutting or slitting wheels 36 are mounted on vertically spaced apart transversely extending shafts 37 which are, in turn, journaled on the crank arms 32. In addition, each of the shafts 37 also carry gears 38 for meshing engagement with the gears 34 in the manner as illustrated in FIGS. 14 and 15. The shafts 37 are eccentrically located so that the cutting wheels 36 will impart a type of shearing action.

Comparing FIG. 14 to FIG. 15, it can be seen that when the piston 28 is retracted within the cylinder 27, the various cutting shifted out of shearing engagement with the tape, in the manner as illustrated in FIG. 14. In this manner, the tape is permitted to pass through without providing any slits therein. However, when the piston 28 is extended with respect to this cylinder 27, the cutting wheels 36 are brought into contact with the tape in the manner as illustrated in FIG. 15. Furthermore, it can be seen that as the wheels 36 rotate, they will also reciprocate slightly vertically in order to aid in the cutting action. This reciprocative action, as indicated previously, occurs by virtue of the eccentric location of the shafts 37.

Having thus described our invention, what we desire to claim and secure by Letters Patent is:

1. A filament tape applicator for applying filament containing tape to a work surface of complex curvature, said applicator comprising:
(1) support means,
(2) tape supply means operatively retained by said support means and including a filament containing tape and backing member composite which is dispensable from said tape supply means,
(3) tape placement means on said support means for receiving and applying said tape to a work surface,
(4) means for creating a series of slits through the tape and backing member to form a series of longitudinally extending adjacent strands,
(5) first and second spaced apart positively driven tape drive means for engaging the tape during movement thereof and creating compensating demand available storage loops from said tape strands and for supplying the strands in said loops to said placement means, and
(6) control means operatively associated with said first and second spaced apart tape drive means for controllably operating said first and second drive means at relative speeds to create and maintain the demand available storage loops therebetween.

2. The filament tape applicator of claim 1 further characterized in that said control means comprises photoelectric means for monitoring the amount of tape strands in said storage loops.

3. The filament tape applicator of claim 2 further characterized in that control means is operable in conjunction with said photoelectric means to periodically maintain a relatively constant amount of tape strands in said storage loops.

4. The filament tape applicator of claim 1, further characterized in that said first and second tape drive means comprise roller means located on each side of said storage loops to control the amplitude of said storage loops within preestablished limits.

5. A tape applicator for applying filament containing tape to a work piece, said applicator comprising:
(1) support means;
(2) reel means rotatably mounted on said support means;
(3) a tape of a given length received by and coiled within said reel means in a manner to be withdrawn therefrom upon demand;
(4) a first pair of positively driven nip rolls mounted on said support means for engaging and forwarding said tape at a predeterimned rate;
(5) a second pair of positively driven nip rolls and a tape placement means mounted on said support means, said second pair of nip rolls receiving said tape from said first pair of nip rolls and forwarding the same to said tape placement means, said tape placement means applying said tape to a work piece; and
(6) compensator means mounted on said support means and positioned between said first and second pairs of nip rolls, and said compensator means comprising:
(a) cutter means positioned next adjacent said first pair of nip rolls for severing said tape longitudinally with respect to its length to form a series of adjacent strands;
(b) means for creating compensatory demand available storage loops from said tape strands whereupon said strands may be withdrawn and supplied to said tape placement means at unequal rates; and
(c) sensory means for monitoring the reserve of said tape strands contained in said storage loops and being operable to energize said first pair of nip rolls and increase their peripheral speed relative to said second pair of nip rolls to replenish the depleted supply of said tape strands in said storage loops.

6. A filament tape applicator for applying filament containing tape to a work surface of complex curvature, said applicator comrising:
(a) frame means,
(b) tape supply means operatively retained by said support means for dispensing on demand a filament containing tape and backing member,
(c) tape placement means on said frame means for receiving and applying said tape to said work surface,
(d) means for creating a series of slits through the tape and backing member to form a series of adjacent longitudinally extending strands,
(e) storage loop generating means for creating compensating demand available storage loops from said tape strands and supplying the strands in said loops to said placement means for application to said work surface, and
(f) means operatively associated with said storage loop generating means for alternatingly biasing each of the adjacent storage loops in opposite directions.

7. The filament tape applicator of claim 6 further characterized in that the storage loop generating means comprises first and second positively driven spaced apart tape drive means located on opposite sides of the storage loops.

8. The filament tape applicator of claim 6 further characterized in that control means is operatively associated with said storage loop generating means to control the amplitude of the storage loops within preestablished limits.

9. The filament tape applicator of claim 6 further characterized in that the storage loop generating means comprises a first pair of positively driven rollers and a second pair of positively driven rollers located on its opposite side of the storage loops with respect to the first pair of rollers.

10. The filament tape applicator of claim 6 further characterized in that the filament containing tape is preimpregnated with a curable resin matrix composition, and is disposed on the backing member and is removable therefrom.

11. The filament tape applicator of claim 6 further characterized in that the storage loop generating means operates to create somewhat incomplete sine wave storage loops with amplitudes sufficient to provide an adequate supply of strand segments in the storage loops.

12. The filament tape applicator of claim 6 further characterized in that the means for creating the series of slits comprises a plurality of cutting rollers aligned transversely with respect to the movement of the tape.

13. The filament tape applicator of claim 6 further characterized in that said tape applicator also comprises cutting means for cutting the tape transversely to thereby form a terminal edge thereon.

14. A tape laying path length compensator for use with a filament tape applicator, and which applicator comprises a frame, a tape supply means on said frame for dispensing filament containing tape of a given length which is withdrawn from said supply means upon demand, and a tape placement means located to receive the dispensed tape for applying the tape to a work piece; said tape laying path length compensator comprising first positively driven tape drive means for engaging and forwarding said tape at a predetermined rate, second positively driven tape drive means receiving said tape from said first tape drive means and forwarding the same to said tape placement means, cutter means positioned next adjacent said first tape drive means for severing said tape longitudinally with respect to its length to form a series of adjacent strands, means for creating compensatory demand available storage loops from said tape strands whereupon said strands may be withdrawn and supplied to said tape placement means at unequal rates, and means for monitoring the reserve of said tape strands contained in said storage loops and being operable to actuate said first tape drive means and increases its tape driving speed relative to said second tape drive means to replenish the depleted supply of said tape strands in said storage loops.

References Cited

UNITED STATES PATENTS

| | | | |
|---|---|---|---|
| 2,147,421 | 2/1939 | Bendz | 226—42 |
| 2,147,467 | 2/1939 | Stephenson | 226—42 |
| 3,480,502 | 11/1969 | Schrenk | 156—271 |
| 3,579,396 | 5/1971 | Washburn et al. | 156—271 X |

EDWARD G. WHITBY, Primary Examiner

U.S. Cl. X.R.

156—271, 368, 448, 525, 530